(12) United States Patent
Hwang et al.

(10) Patent No.: US 6,948,735 B2
(45) Date of Patent: Sep. 27, 2005

(54) VARIABLE COVER OF CURTAIN AIRBAG FOR VEHICLE

(75) Inventors: Jin-Chul Hwang, Kyunggi-do (KR); Ik-Hwan Kim, Chungcheongnam-do (KR); Byong-Ryong Cho, Kyunggi-do (KR); Seo-Hong Kim, Kyunggi-do (KR); Kyu-Heum Choi, Kyunggi-do (KR); Tae-Ho Song, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 80 days.

(21) Appl. No.: 10/330,323

(22) Filed: Dec. 30, 2002

(65) Prior Publication Data

US 2004/0124614 A1 Jul. 1, 2004

(30) Foreign Application Priority Data

Jun. 15, 2002 (KR) .................. 10-2002-0033470

(51) Int. Cl.$^7$ ............................................. B60R 21/16
(52) U.S. Cl. ................. 280/728.2; 280/728.3; 280/730.2
(58) Field of Search .................. 280/728.3, 728.2, 280/730.2; 296/136.1, 136.13; 150/166

(56) References Cited

U.S. PATENT DOCUMENTS

| | | | | |
|---|---|---|---|---|
| 4,889,171 A | * | 12/1989 | Minimo .................. | 150/166 |
| 4,951,993 A | * | 8/1990 | Taboada ................ | 296/136.13 |
| 5,201,563 A | * | 4/1993 | Liao ....................... | 296/97.4 |
| 5,275,460 A | * | 1/1994 | Kraus ..................... | 296/136.13 |
| 5,306,347 A | * | 4/1994 | Semle et al. ............. | 118/504 |
| 5,308,111 A | * | 5/1994 | Sommer ................. | 280/728.3 |
| 5,628,527 A | * | 5/1997 | Olson et al. ............. | 280/730.2 |
| 5,884,937 A | * | 3/1999 | Yamada .................. | 280/730.2 |
| 5,899,486 A | * | 5/1999 | Ibe ......................... | 280/728.2 |
| 6,089,605 A | * | 7/2000 | Muller .................... | 280/806 |
| 6,267,407 B1 | * | 7/2001 | Zychowicz et al. ...... | 280/728.2 |
| 6,447,005 B2 | * | 9/2002 | Alb et al. ................ | 280/730.2 |
| 6,488,053 B1 | * | 12/2002 | Tadokoro ................ | 138/156 |
| 2003/0184057 A1 | * | 10/2003 | Kumagai ................ | 280/728.3 |
| 2004/0108693 A1 | * | 6/2004 | Foster et al. ........... | 280/730.2 |

* cited by examiner

*Primary Examiner*—Paul N. Dickson
*Assistant Examiner*—George D. Spisich
(74) *Attorney, Agent, or Firm*—Greenblum & Bernstein, P.L.C.

(57) ABSTRACT

A variable cover of a curtain airbag for a vehicle includes a plurality of bellows, which control the angle and the extending length of a circular or a polygonal shaved cover. The variable cover also includes a rupturing part, which guides the spreading direction of an airbag cushion via hooks or scoring. The combination of features provided by the variable cover is standardized to accommodate the roof side rail of different vehicles.

18 Claims, 2 Drawing Sheets

VARIABLE COVER OF CURTAIN AIRBAG FOR VEHICLE

BACKGROUND OF THE INVENTION

1. Field of the Invention

The present invention relates to a variable cover of a curtain airbag for a vehicle, more particularly to a variable cover of a curtain airbag for a vehicle in which bellows are created in the variable cover equipped with a curtain airbag cushion.

2. Description of the Related Art

In general, a curtain airbag plays a role of preventing a passenger from being injured in the head or the breast during broadside collision or by broken glass of a side door.

With reference to FIG. 1, the conventional curtain airbag 100 protects a passenger from being injured in the side during an automobile accident by mounting a cover 120 in the roof side rail 110 positioned in the upper side of a side door (not illustrated) of a car and expanding an airbag cushion (not illustrated) mounted in this cover 120 by means of high-pressure air current and exploding the exploding part of the cover 120 to expand downward.

At this moment, the cover 120 is a hard type of cover, manufactured with metal patterns, so it is impossible to transform its pattern. Thus, it should be always mounted only on the predetermined area of the same type of vehicle. As a result, new metal patterns should be designed to manufacture the cover 120 for other types of vehicles which have different patterns in accordance with different angles of the area requiring transformation of the pattern.

SUMMARY OF THE INVENTION

To solve the above-indicated problems, it is, therefore, an object of the present invention to provide a variable cover of a curtain airbag for a vehicle by manufacturing a cover for creating bellows to be bent freely, and forming an exploding part by a hook or a scoring process to apply a cover, manufactured from a metal pattern, to various kinds of vehicles, minimize the manufacturing cost, simplify the working processes with standardization of a cover, and improve a worker's convenience.

To achieve the above object, there are formed bellows in at least over one area to change the angles freely in accordance with inclination angles of a roof side rail in a curtain airbag installed for the airbag cushion to expand downward from the cover attached to the roof side rail of a vehicle.

The cover has a structure made with a circular shape or over trihedrons.

The cover includes an exploding part from a scoring process for an airbag cushion to spread downward.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
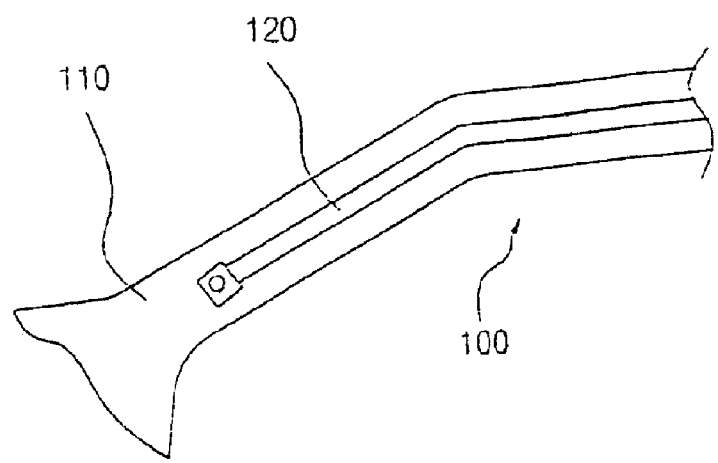
FIG. 1 is an installation drawing illustrating the cover installed in traditional curtain airbag.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
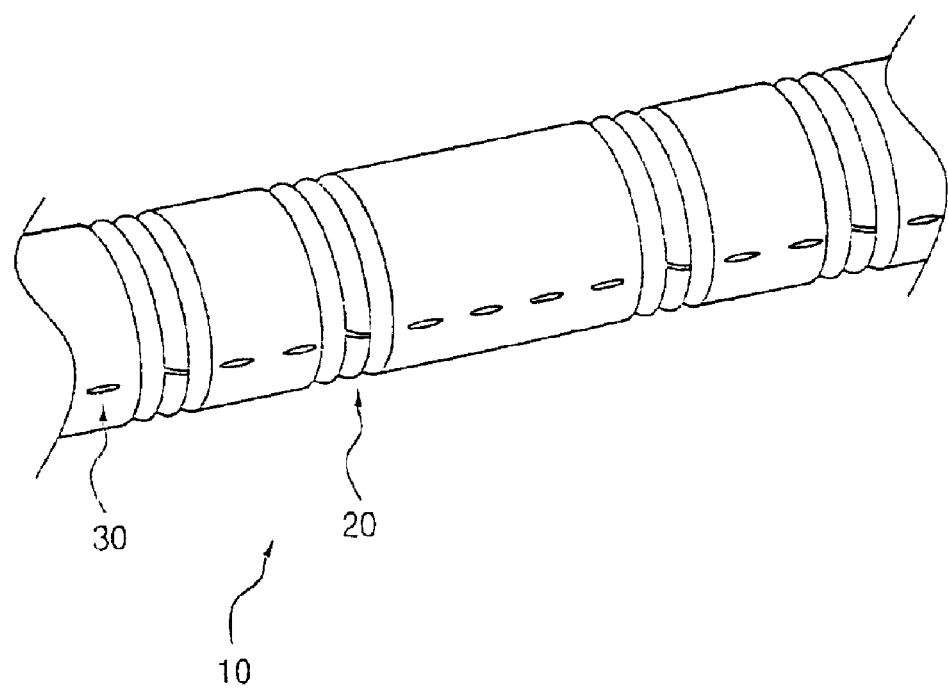
FIG. 2 is a perspective view illustrating a variable cover of a curtain airbag for a vehicle in accordance with preferred embodiments of the present invention.

FIG. 2 is a perspective view illustrating a variable cover of a curtain airbag for a vehicle in accordance with preferred embodiments of the present invention. According to the present invention, a variable cover 10 includes bellows 20, which can be bent at variable angles, and an exploding part 30, which explodes by means of an expanding force of an airbag cushion (not illustrated).

The bellows 20 are formed in over one area in the cover 10 for the cover 100 manufactured by standardization to be bent to the shapes of the roof side rail and mounted on different roof side rails (as illustrated in FIG. 1) which require different angles in accordance with types of vehicles.

In addition, the bellows allow their lengths to be controlled, and thereof, they can be changed to the whole length of the cover 10, which can have an useful area for the mounting length of the cover 10 in accordance with the length of the roof side rail.

At this moment, it is possible to make different distances between bellows formed in the cover 10.

In general, the exploding (or rupturable) part 30 guides the spreading direction of the airbag cushion downward upon an exploding force when the airbag cushion in the cover 10 expands due to high-pressure air current from a high-pressure air current generator (not illustrated). It is formed in the lengthwise direction of the cover 10, and when the cover 10 is mounted on a vehicle, it faces downward.

In addition, the exploding (or rupturable) part 30 is formed in a way that both circumferential ends of the cover 10 are coupled by a plurality of hooks or such that the scoring process forms holes in the cover 10 at predetermined intervals.

Figure 3A:
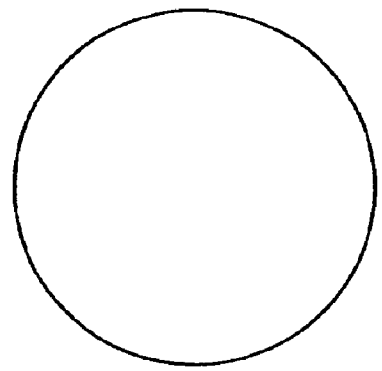
FIGS. 3(A), 3(B), and 3(C) illustrate exemplary cross-sectional shapes of the cover.
Figure 3B:
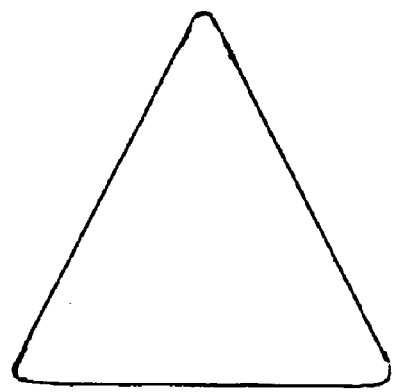
Figure 3C:
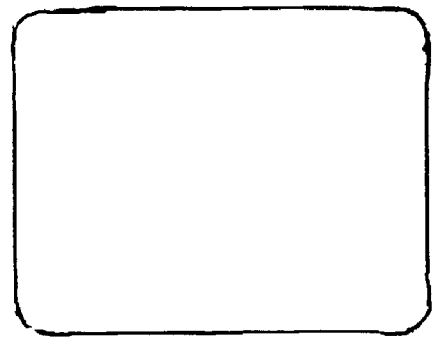

On the other hand, it is desirable to manufacture the cover 10, where the bellows 20 and the exploding part 30 are formed, into various shapes, such as a circle or into polygonal shapes such as a triangle or a quadrangle, as illustrated in FIGS. 3(A), 3(B), and 3(C).

As described in the above, there are formed a plurality of bellows, which can control the angle and length of the cover which has a circular or polygonal shape, and an exploding part, which guides the spreading direction by being exploded by an exploding pressure of an airbag cushion, by a hook or a scoring process. This can guide the standardization of a cover which can be applied to the roof side rail of different vehicles. Thereby, it contributes to reduce the manufacturing cost by preventing manufacturing the cover individually in accordance with the existing vehicles and enhance a worker's convenience by aiming at a uniformity of the working process.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A variable cover of a curtain airbag for a vehicle, said variable cover comprising bellows in at least one area, said bellows being configured to enable said cover to be variably configured to adjust to inclination angles of a roof side rail in a curtain airbag installed for an airbag cushion to expand outwardly from the cover, which is configured to be attached to the roof side rail of a vehicle.

2. The variable cover according to claim 1, wherein the cover comprises one of a circular shape and a triangular shape.

3. The variable cover according to claim 1, further comprising a rupturable part that guides the spreading of the airbag cushion downwards.

4. The variable cover according to claim 3, wherein the rupturable part includes a scored portion.

5. The variable cover according to claim 1, further comprising bellows in a plurality of areas, wherein different distances are provided between the bellows of each of the plurality of areas.

6. The variable cover according to claim 1, further comprising holes spaced at intervals.

7. A cover for an airbag, comprising:

a plurality of bellows spaced along the cover and that are configured to expand and bend in accordance with inclination angles of a roof side rail;

wherein a cross sectional shape of the cover comprises one of a circle, a triangle, and a quadrangle.

8. The cover according to claim 7, wherein the plurality of bellows are spaced along the length of the cover.

9. The cover according to claim 7, wherein different distances are provided between the plurality of bellows.

10. The cover according to claim 7, further comprising holes spaced at intervals.

11. A cover according to claim 7, further comprising a rupturable part that guides an expansion direction of an airbag cushion.

12. The cover according to claim 11, wherein the expansion direction comprises a downward direction.

13. The cover according to claim 7, further comprising a rupturable part including a scored portion to guide the spreading of the airbag cushion downwards.

14. A variable cover comprising:

a plurality of bellows configured to enable said variable cover to be configured to adjust to variable inclination angles of a portion of a vehicle, whereby the variable cover is adaptable to vehicles differing in size; and a rupturable part that guides an expansion direction of an airbag cushion.

15. The variable cover according to claim 14, wherein the plurality of bellows are spaced along the length of the cover.

16. The variable cover according to claim 14, wherein different distances are provided between the plurality of bellows.

17. The variable cover according to claim 14, wherein a cross sectional shape of the variable cover comprises one of a circle, a triangle, and a quadrangle.

18. The variable cover according to claim 14, further comprising holes spaced at intervals.

* * * * *